No. 766,940. PATENTED AUG. 9, 1904.
E. E. DRURY.
RUNNER FOR WHEELED VEHICLES.
APPLICATION FILED MAR. 10, 1904.
NO MODEL. 2 SHEETS—SHEET 1.

Witnesses
R. A. Boxwell,
A. L. Hough.

Inventor
Elmer E. Drury,
By Franklin H. Hough
Attorney

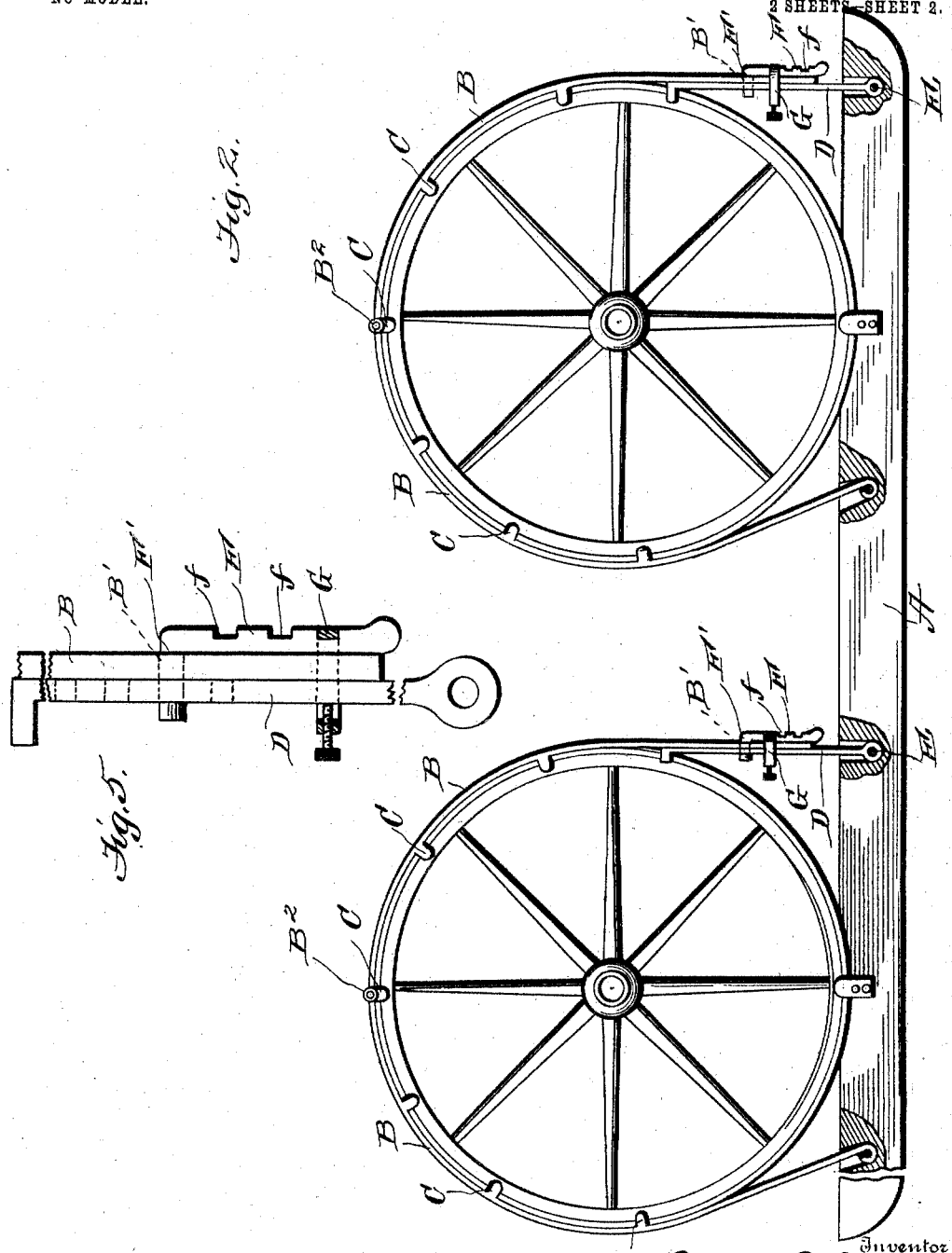

No. 766,940. Patented August 9, 1904.

UNITED STATES PATENT OFFICE.

ELMER E. DRURY, OF GLOUSTER, OHIO.

RUNNER FOR WHEELED VEHICLES.

SPECIFICATION forming part of Letters Patent No. 766,940, dated August 9, 1904.

Application filed March 10, 1904. Serial No. 197,479. (No model.)

*To all whom it may concern:*

Be it known that I, ELMER E. DRURY, a citizen of the United States, residing at Glouster, in the county of Athens and State of Ohio, have invented certain new and useful Improvements in Runners for Wheeled Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in runner attachments for wheeled vehicles; and the object of the invention is to produce a simple and convenient apparatus for direct attachment to the wheels of a vehicle whereby the same may be used when snow is upon the ground.

My invention consists of a device of this character which is composed of various details of construction and combinations and arrangements of parts, which will be hereinafter fully described and then specifically defined in the appended claims.

I illustrate my invention in the accompanying drawings, which, with the letters of reference marked thereon, form a part of this application, and in which drawings—

Figure 1:
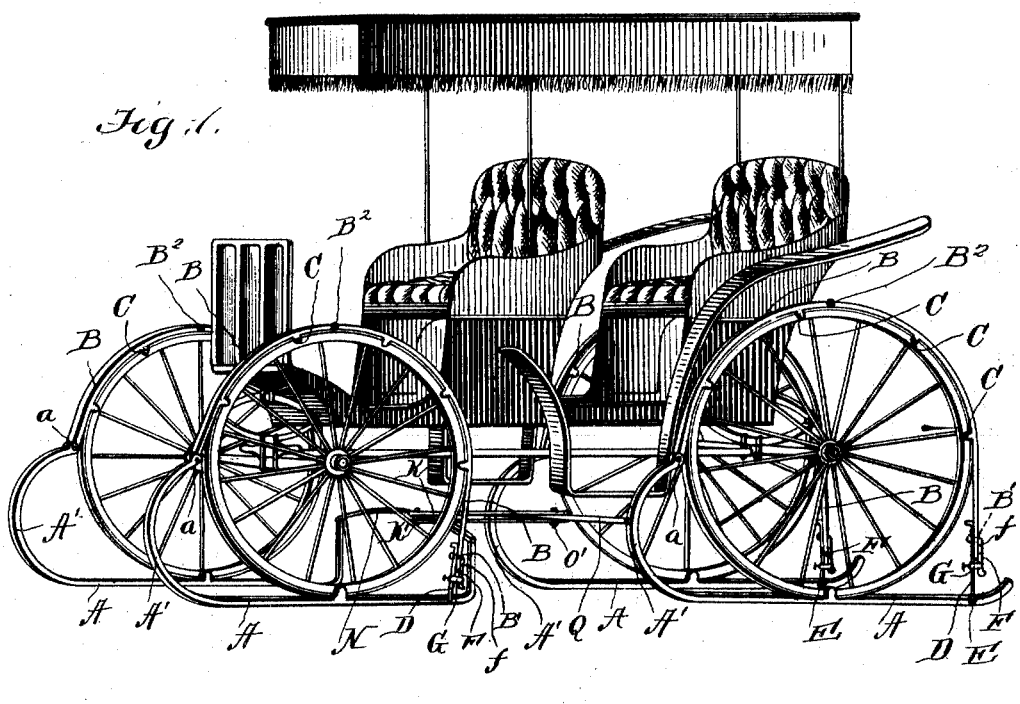
Figure 3:
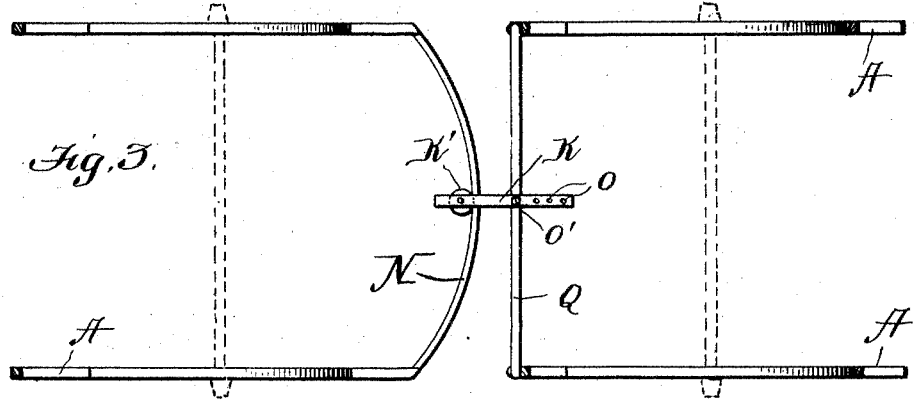
Figure 4:
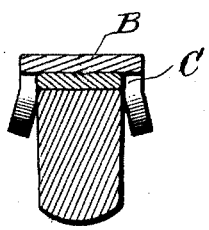

Figure 1 is a perspective view showing my improved runner as applied to a carriage. Fig. 2 is an enlarged detail view showing a single runner attached to the rims of two wheels. Fig. 3 is a top plan view of the runners and connections therefor. Fig. 4 is a sectional view through a wheel, showing my retaining-band as applied thereto; and Fig. 5 is a detail view of the fastening means for holding a band or rod about the circumference of the wheel.

Reference now being had to the details of the drawings by letter, A designates one of my runners, which is made from a single piece of metal and may be made so as to extend underneath both side wheels of the vehicle, or a separate runner may be utilized, if desired, for each wheel, in which latter event the runner may be connected by suitable mechanism.

Referring to Fig. 1 of the drawings, it will be seen that the forward end of each runner is upwardly curved, as at A', and has an eye $a$ engaged by a band B, of steel, and is adapted to partially encircle the rim of the vehicle-wheel, as shown. Projecting from said band at intervals are the retaining members C, which are bent so as to engage the tire of the wheel, but not the rim, thereby preventing a rubbing action, which would mar the finish of the rim or felly. One end of said band is provided with apertures B', and D designates a second metallic band, having an eye which is pivotally mounted upon a pin E, secured to the runner. Said band D is also provided with apertures, and the two ends of the bands D and B are adapted to overlap, and in adjusting said bands in position to engage and hold the runner to a wheel the apertures in said bands are in registration and adapted to receive a fastening-bar F, which has an angled end F', designed to engage in said apertures, and a retaining band or ring G is provided which is adapted to engage notches $f$ in the shank portion of said retaining member F, whereby the two bands may be held taut and in so doing hold the wheel securely to the runner.

Where bobs are employed, a connecting-bar K is provided, which carries an antifriction-roller K' at one end, which is adapted to ride upon the concaved portion of the connecting-bar N, which connects the rear ends of the runners of the forward wheels of the vehicle, while the other end of said bar K comprises a series of apertures O, through which a retaining-bolt O' may be passed to engage a cross-bar Q, connecting the forward ends of the runners of the rear bob. By this means the device may be easily adjusted to different-length running-gear, and while the bar K is held stationary the forward bob may be allowed to turn.

In order to make it possible to fold the bands B, they may be provided with hinge-joints $B^2$.

By the provision of a runner apparatus made in accordance with my invention it will be observed that simple and efficient means is provided which may be easily applied to any wheeled vehicle and without in any way marring the wheel, and thus rendering the vehicle convenient for ready use with snow, and when not in use the apparatus may be folded into a compact space.

Having thus fully described my invention, what I claim as new, and desire to secure by Letters Patent, is—

1. A runner apparatus for wheeled vehicles comprising a metallic runner, a band secured to said runner and adapted to partially surround and engage the tire of a wheel, projections upon said band adapted to hold the latter upon the wheel, a second band pivoted to the runner, a locking-lever adapted to engage registering apertures in said bands, and means for holding said lever in a locking position, as set forth.

2. A runner apparatus for wheeled vehicles comprising metallic runners, bands pivotally mounted to the forward curved ends of said runners, angle members projecting laterally from said bands and adapted to hold the latter upon the tires of wheels, short bands fastened to the rear portions of the runners, locking-levers each having an angled end adapted to be inserted in registering apertures in said bands, and a ring adapted to engage notches in the shank portion of each lever and hold the latter in a locking relation, and a crossbar connecting the rear ends of the runners, as set forth.

In testimony whereof I hereunto affix my signature in presence of two witnesses.

ELMER E. DRURY.

Witnesses:
D. DILLES,
G. W. CAVAY.